United States Patent [19]
Clampitt et al.

[11] 3,819,514
[45] June 25, 1974

[54] OIL SPILL RECOVERY

[75] Inventors: Bert H. Clampitt, Overland Park; Kenneth E. Harwell, Merriam; Joseph W. Jones, Jr., Leawood, all of Kans.

[73] Assignee: Gulf Research & Development Company, Pittsburgh, Pa.

[22] Filed: Sept. 24, 1971

[21] Appl. No.: 183,574

[52] U.S. Cl............................ 210/40, 210/DIG. 21
[51] Int. Cl............................................. B01d 15/00
[58] Field of Search........ 210/40, 242, DIG. 21, 30; 260/2.5, 94.9, 827, 842, 878

[56] References Cited
UNITED STATES PATENTS

| | | | |
|---|---|---|---|
| 3,147,216 | 9/1964 | Oemler | 210/40 |
| 3,544,490 | 12/1970 | Alexander et al. | 260/2.5 |
| 3,681,237 | 8/1972 | Orban et al. | 210/30 |

*Primary Examiner*—John Adee
*Assistant Examiner*—Robert H. Spitzen

[57] ABSTRACT

An article of manufacture for use in the removal and recovery of oil slicks or spills floating on the surfaces of bodies of water consisting essentially of a foam of an ethylene-alkyl acrylate copolymer having a melt index of at least 800, preferably an ethylene copolymer containing from about 10 up to about 45 weight percent methyl acrylate having a melt index in the range of from about 1,000 up to about 2,000 and a process for using such foams in the selective removal of oil from water surfaces and the recovery of the absorbed oils from said foams is disclosed.

6 Claims, 1 Drawing Figure

OIL SPILL RECOVERY

BACKGROUND OF THE INVENTION

1. Field of the Invention

The present invention relates to a method and composition of matter for separating normally liquid hydrocarbon compounds from a liquid of higher specific gravity. More specifically, the subject invention is concerned with a method and composition of matter for selectively recovering oil from the surface, or which is floating on, a liquid of higher specific gravity such as a body of water. This invention also pertains to an improved absorber for the selective absorption or removal of oil from water surfaces and to the recovery of the absorbed oil from the absorber. The improved absorber of the invention is particularly adoptable for use in a method for the removal of oil slicks or spills from the surface of a body of water, particularly the sea.

2. Description of the Prior Art

The need for recovery of oil spills has been known to exist for many years. In recent years, there has been considerable publicity in connection with oil spills in the water, particularly with the increasing transportation of oil by tankers throughout the waterways of the world and with the increase in offshore drilling operations. The problem of cleaning up oil spills or oil slicks from the surface of the water and particularly sea water has become of increasing concern not only from an economic aspect but also because of the marine biological impact of such oil spills. It is known, for example, that layers of oil upon bodies of water resulting from the accidental or purposeful discharge of oils into a body of water produce a surface film that may be combustible to endanger the area. Moreover, oil films cause damage to aquatic life in the water, render bodies of water unsightly and frequently cause contamination of areas washed by the bodies of water, killing marine life and ruining the neighboring beaches.

Furthermore, one of the problems encountered subsequent to removal of oil from the surface of water is the physical disposal of the large volumes of oil involved. For example, in the recent oil spillage on the California coast one of the methods of removing the oil was to spread straw along the beaches and allow the oil to be absorbed by the straw. However, the disposal of the oil-impregnated straw reached enormous proportions and it was found necessary to bury tremendous quantities of oil-impregnated straw rather than resorting to burning thereof in view of the air contamination problem which then would have occurred.

The removal of oil slicks and oil spills is not confined to marine disasters only, such as have occurred on the coast of California and the coast of Southern England, but also is present on the rivers which are navigated by oil barges and the like. Furthermore, the separation of minor amounts of oil from water is highly desirable in cases where water is used for cooling purposes and the like such as in many industrial operations. If water can be readily separated from oil, then the water may be recycled for any number of desired times without contamination of the equipment by oil which may have come into contact therewith.

In view of the above, it is not surprising that numerous efforts of a varying nature have been made to solve the problem of oil leakage. A typical proposed solution is the provision of means to partially or completely surround the area of oil accumulation on the water and then to collect and pump such oil to a desirable storage area. Such purely mechanical recovery systems are difficult to establish and maintain owing to the normally large area of leakage and the constant wave action in such areas.

It has also been proposed to use oil absorbing materials, such as straw or vermiculite, with such materials being spread on the surface of the water where the oil leakage occurs and subsequently collected with the oil absorbed on the surface thereof. Although this absorption method has obvious advantages, the big drawback is the recovery of this material and the ultimate disposition thereof, with such material when coated with oil being essentially a waste product. Additional absorbent materials of this same general nature and heretofore used to remove oils from bodies of water include sand, kieselguhr, diatomaceous earth, peat fibers and sawdust. Many of these absorbent materials are unsuitable for the selective recovery of oil films from bodies of water, and while these materials are operable to a certain extent it should be understood that there are inherent disadvantages to the use of inorganic and microporous substances in finely divided form. These disadvantages include the capillary attraction of the particles for water as well as the oily substances, so that a large part of the absorptive capacity of the particles is consumed by saturation by water and is unavailable for pick up of the oil.

SUMMARY OF THE INVENTION

It is a general object of the present invention to provide an improved method or process for removing and recovering oil films from the surface of bodies of water which process does not entail a major subsequent disposal problem.

It is another general object of the subject invention to provide an improved absorbent material adopted to remove oil films from the surface of bodies of water which material is capable of the selective absorption of oil, which does not evidence retransfer of the absorbed oil to the water from its interstices and which is not an absorbent as to the water.

A further and more specific object of the invention is to provide an absorbent material which is capable of soaking up oily films and substances which are floating on bodies of water without any appreciable loss in the efficiency of the absorbent material after the same has been exposed to or in the presence of moisture or in contact with a body of water.

Yet another specific object of this invention is to provide an improved absorbent material for the selective removal and recovery of oil from a body of water, which material may be used repeatedly; that is, the material may be put through the removal and recovery cycles repeatedly, without substantial loss in efficiency as to its oil pick up ability and the recovery of absorbed oil therefrom.

Still another object of the invention is to provide an improved method and superior composition of matter for treating oil leakage, spills or slicks on a water surface, wherein a material having a high affinity for oil and a low affinity for water is spread onto the surface of the water and subsequently recovered for removing the oil from the body of water and recovering of the oil from the material.

In general, these objects are obtained by providing a foamable composition of matter and the resulting foam thereof after the same has been foamed which is particularly useful in the removal and recovery of oil from water surfaces, which composition consists essentially of a blend of an ethylene-alkyl acrylate copolymer having a melt index of at least 800, an azodicarbonamide blowing agent having a decomposition temperature in the range of 145°–165° C., the concentration of said azodicarbonamide being in the range of 1–15 parts per 100 parts of said ethylene copolymer, a crosslinking agent selected from the group consisting of dicumyl peroxide and ditertiary butyl ether of the dihydroperoxide of diisopropyl benzene, the concentration of said crosslinking agent being in the range of 1–7 parts per 100 parts of said ethylene copolymer, an alkyl acrylate monomer boiling above 150° C. and soluble in said ethylene copolymer, the concentration of said alkyl acrylate monomer being in the range of 1–20 parts per 100 parts of said ethylene copolymer, and a polyfunctional unsaturated monomer selected from the group consisting of polyfunctional unsaturated esters, divinyl benzenes, triallyl isocyanurate and triallyl cyanurate, the concentration of said polyfunctional unsaturated monomer being in the range of 0.1–10 parts per 100 parts of said ethylene copolymer. In this composition of matter, the crosslinking agent is preferably dicumyl peroxide, the alkyl acrylate monomer is preferably lauryl acrylate and the polyfunctional unsaturated monomer is preferably triallyl isocyanurate. The preferred ethylene-alkyl acrylate copolymer to be used in the above-described composition of matter is an ethylene copolymer containing from about 15 up to about 45 weight percent methyl acrylate and having a melt index of from about 1,000 up to about 2,500. The invention also contemplates a method or process for the use of the above-described foams in the selective removal of oil slicks or spills floating on surfaces of bodies of water and the ultimate recovery of the oil absorbed by these foams.

BRIEF DESCRIPTION OF THE DRAWING

The novel features which are believed to be characteristic of this invention are set forth with particularity in the appended claims. The invention itself, however, both as to its organization and method of operation together with further objects and advantages thereof may best be understood by reference to the following detailed description taken in connection with the accompanying drawing in which:

DETAILED DESCRIPTION OF THE INVENTION

Figure 1:
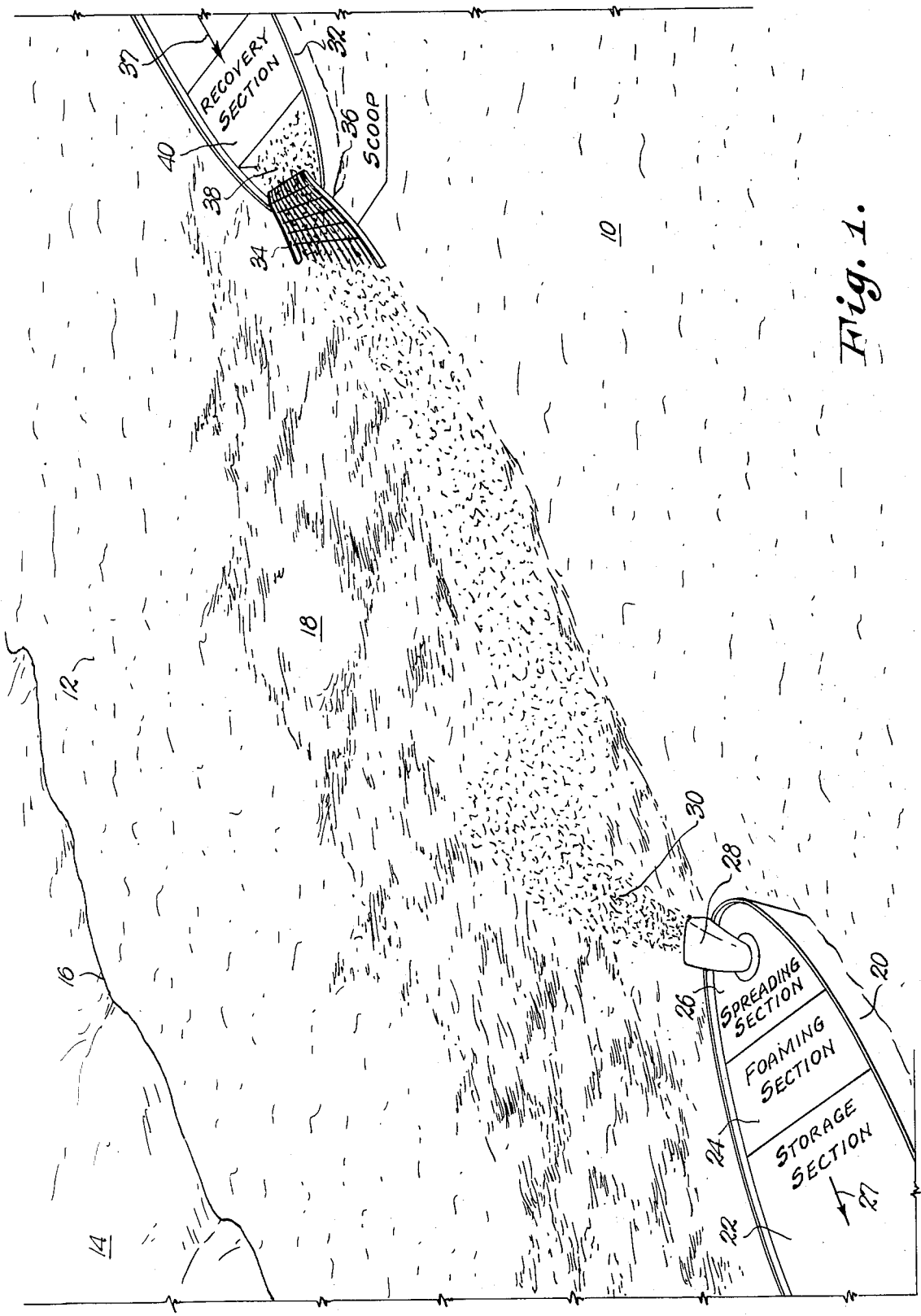
FIG. 1 is a perspective view of an arrangement used to carry out the method or process of this invention.

Alexander et al disclose in U.S. Pat. No. 3,544,490 of Dec. 1, 1970, superior open-cell free-rising foam compositions prepared from ethylene-alkyl acrylate copolymers and to a process for preparing such foam compositions. We have unexpectedly found that these ethylene-alkyl acrylate copolymer foams show an abnormally high selectivity and capacity for oil absorption. These ethylene-alkyl acrylate foam materials may be advantageously used to remove and recover large quantities of oil spilled and floating on the surface of a body of water, and employed in a process for accomplishing the pick up or clean up of oil spills, slicks and the like existing on a body of water.

The specification of the above-mentioned U.S. Pat. No. 3,544,490, inasmuch as it relates to foam compositions prepared from ethylene-alkyl acrylate copolymers and to a process for preparing such compositions, is hereby incorporated into this application by reference.

The ethylene copolymers employed in preparing the foam compositions used in this invention comprise those ethylene-alkyl acrylate copolymers having a melt index of about 800 up to about 3,000 and preferably a melt index in the range of from about 1,000 up to about 2,500. Specifically, the melt index of the ethylenealkyl acrylate copolymers used to produce the foams employed in this invention are most favorably in the range of from about 1,400 up to about 1,500. The alkyl acrylates employed in preparing the ethylene-alkyl acrylate copolymers from which the foams are produced are the low molecular weight alkyl acrylates wherein the alkyl group contains from 1 up to about 4 carbon atoms. More specifically, the most favored alkyl acrylate employed in preparing the ethylene-alkyl acrylate copolymers from which the foams are produced is methyl acrylate. The methyl acrylate may be present in the ethylene-methyl acrylate copolymer, from which the foams are prepared and which are employed in this invention, in amounts of from about 10 up to about 45 percent based on the total weight of the copolymer, and preferably in an amount in the range of from about 15 up to about 40 weight percent.

The foam, prepared from a composition mixture including the ethylene-alkyl acrylate copolymer, used in this invention may be employed and applied to the oil spill in a great variety of ways, such as small chips of the foam spread on the oil spill or slick on the water surface by means of an air blower, dropping small chips or blocks of the foam on the oil spill from aircraft, manually spreading chips or pieces of the foam on the oil slick with pitchfork or other similar means, dragging and skimming the slick with blocks of foam held in a net similar to a fishing net, covering the oil spill with the foam in a sheet-like structure having a reinforcing net embedded therein, and other like means.

In order to illustrate the invention and the advantages thereof with greater particularity, the following specific examples are included. They are intended to illustrate the invention only and are not intended to limit the same in any way.

EXAMPLE 1

The following materials were weighed and then blended together:

| Material | Amount |
| --- | --- |
| Ethylene copolymer containing 20 weight percent methyl acrylate (having an ASTM melt index of 2,000 g./10 min.) | 100 g. |
| Azodicarbonamide | 8 g. |
| CBP-2 (a polymeric zinc salt in an inert solvent, used as a catalyst to increase the decomposition rate of the azodicarbonamide) | 2 g. |
| Dicumyl Peroxide | 2.5 g. |
| Lauryl Acrylate | 6 g. |
| Triallyl Isocyanurate | 1.5 g. |
| Dimethyl Silicone Oil | 1 g. |

The blending of these materials was carried out on a laboratory steam heated two-roll mill. After blending, the mixture was removed from the mill and cooled to a solid plastic mass, from which it may be formed into any convenient shape and size, such as pellets, sheets or blocks by known extrusion and chopping methods. Thereafter, the blended and shaped material may be stored for long periods of time prior to the foaming thereof.

To produce a foamed product from the above blended material, the same is exposed to an elevated temperature of about 170° C. to about 180° C. for a period of 10 to about 30 minutes. The blended material may, for example, be foamed when placed in a circulating air oven which is heated to these temperatures. Upon cooling, the foam may be cut if so desired into any optimum size or shape for ready use thereof. The foam is now ready for pick up or removal and recovery of spilled oil or oil otherwise floating on a body of water, but the same may be again stored if so desired.

EXAMPLE 2

In this example, foams made in accordance with this invention, such as those prepared in Example 1, are compared with other known readily and commercially available foams. After the blended material of Example 1 was foamed, small blocks were cut from the foamed structure. These small blocks were floated on Kuwait crude oil placed in beakers along with similar blocks of commercially obtained rubber foam and polyurethane foam. After the elapse of a short time period, it was observed that the foam of the ethylene copolymer was wetted by the crude oil, whereas the foam rubber and the polyurethane foam were not wetted. It was additionally observed that when the ethylene copolymer foam was in contact with the crude oil, the same would absorb it rapidly until the foam block was saturated or the oil was exhausted, whereas the foams of the other two materials showed no affinity for the oil. The ethylene-methyl acrylate copolymer foam was found to absorb over 7 times its own weight of the crude oil.

EXAMPLE 3

In another experiment employing the foamed structure as obtained in Example 1, approximately ½ cup of crude oil was spread on the surface of a 24 inch by 24 inch pan of water. The ethylene-methyl acrylate copolymer foam of Example 1 was cut into several strips or chips varying in length of from about 1 to about 3 inches. They were then placed on the water in the pan as above described. The strips of ethylene copolymer foam and oil spots floating on the water in the pan were brought into contact with each other by wave action. After a few minutes of time had elapsed, it was observed that essentially all of the oil floating on the water within the pan had been absorbed by the copolymer foam. Similar experiments were carried out first using polyurethane foam chips or strips and then rubber foam in the form of strips or chips was employed. In both of these experiments, it was observed that very little oil was absorbed.

EXAMPLE 4

In this example, the affinity of the ethylene-methyl acrylate copolymer foam of Example 1 for Kuwait crude oil relative to a number of other foams was demonstrated. Strips of a few inches in length of the foam of Example 1, the polyurethane foam and the rubber foam (as used in Example 2) were all respectively placed in small individual dishes of Kuwait crude oil and positioned vertically therein such that the oil could soak up the foam strips like a wick. The rate at which the oil soaked up or wicked up on the various vertically positioned strips of foam was observed at a number of different time intervals and recorded; the results are reproduced herebelow in Table I.

Table I

| Time | Approximate Height of Crude Oil | | |
| --- | --- | --- | --- |
| | Ethylene-Methyl Acrylate Foam | Polyurethane Foam | Rubber Foam |
| 0 | 0 | 0 | 0 |
| 15 minutes | ⅜" | 0 | 0 |
| 30 minutes | ¾" | 0 | 0 |
| 1 hour | 1⅛" | 0 | 0 |
| 3 hours | 1½" | 0 | 0 |

The oil wet the submerged part of the strips of the polyurethane foam and the rubber foam, but showed no tendency to migrate or wick upward on the vertically positioned strips of these two foams. While in constrast, the crude oil was rapidly absorbed by the foam prepared from the ethylene copolymer of Example 1 and did soak up or wick up the vertically positioned strip of this particular foam.

EXAMPLE 5

In this example, the ability of the ethylene-methyl acrylate copolymer foam to remove oil from water was demonstrated. To demonstrate this, a layer of crude oil was poured on water contained in some large dishes. Following this, blocks of the foam of Example 1 were immersed in the dishes for various time intervals. If a little wave action was provided to bring the oil in contact with the ethylene copolymer foam, essentially all of the oil was removed from the water in the dishes in approximately 5 to 10 minutes. In carrying out the experiment, it was observed that the ethylene-methyl acrylate copolymer foam showed no affinity for water but a strong affinity for the crude oil spread on the water. Thus, this type of ethylene copolymer foam has a selective ability to remove the oil and leave the water. In like experiments using polyurethane foam and rubber foam, it was observed that neither of these foams showed much if any affinity for either the water or the oil. Therefore, it was concluded that the ethylene copolymer foam was much superior as an agent for selectively removing oil from or floating on a body of water when compared to polyurethane and rubber foams.

EXAMPLE 6

In this example, the absorption capacity of the three different foams compared in the above examples was measured. Various samples of each of the rubber, polyurethane and ethylene-methyl acrylate foams were cut into a size of about ½ inch by 3 inches by 4 inches. These samples were then immersed in Kuwait crude oil for an hour or more. Next, they were allowed to drain free of any unabsorbed oil on a wire mesh rack for an hour or more and then they were weighed. The absorbed oil was expressed by pressing with a roller from each of the foam samples and then each of the samples and the oil expressed respectively therefrom was reweighed. The results obtained in these experiments were recorded and are shown in Table II below.

Table II

| Sample | Sample Wt., g. | Absorbed Oil, % of Foam Wt. | Recovered Oil, % of Absorbed Oil |
| --- | --- | --- | --- |
| 1 Ethylene-Methyl Acrylate[1] | 9.19 | 1210 | 85.0 |
| 2 Ethylene-Methyl Acrylate[1] | 8.60 | 1320 | 88.9 |
| 3 Ethylene-Methyl Acrylate[1] | 8.00 | 1180 | 89.3 |
| 4 Ethylene-Methyl Acrylate[2] | 10.30 | 1082 | 88.1 |
| 5 Rubber[3] | 6.03 | 156 | 51.0 |
| 6 Polyurethane[3] | 2.38 | 687 | 23.0 |
| 7 Polyethylene[4] | 3.81 | 68 | 79.3 |

[1] Samples 1, 2 and 3 were cut from the same large block (6 inches by 18 inches by 20 inches) of ethylene-methyl acrylate copolymer foam.
[2] Sample 4 was cut from a sheet (½ inch by 11 inches by 11 inches) of ethylene-methyl acrylate copolymer foam and had a smaller cell size than the cell size of the foam used in Samples 1, 2 and 3.
[3] The rubber and polyurethance foam samples were cut from commercially available mattress stock.
[4] The polyethylene foam sample was that of the Dow Chemical Company marketed under the trademark "Ethafoam".

The above data show that the ethylene-methyl acrylate copolymer foam has a much greater absorptive capacity than any of the polyurethane, polyethylene or rubber foams and in addition that a substantially higher percentage of the absorbed oil may be recovered from the ethylene copolymer foam by expressing or squeezing for future use thereof.

EXAMPLE 7

In this example, it was desired to determine whether or not the ethylene-methyl acrylate copolymer foam samples could be used or put through the absorption and expressing cycle repeatedly. Therefore, Samples 1 and 3 of the above Example 6, after having the absorbed crude oil squeezed or expressed therefrom, were reweighed and again immersed in Kuwait crude oil for a minimum time period of 1 hour. The samples were then allowed to drain free of any unabsorbed oil by placement on a wire mesh rack for a period of at least 1 hour and then weighed again. Afterwards, the absorbed oil was again squeezed or expressed from these samples by the use of a roller and the foam samples and recovered expressed oil were weighed. The results obtained were recorded and are set forth in Table III.

Table III

| Sample | Initial Wt., g.[1] | Absorbed Oil % of Dry Foam Wt. | Recovered Oil % of Absorbed Oil |
| --- | --- | --- | --- |
| 1 | 25.83 | 1250 | 103.0 |
| 3 | 18.00 | 1320 | 100.3 |

[1] Initial weight of the sample after expressing the oil of the first cycle, i.e., the sample is wet with oil.

The above data show that the foam samples, when put through the cycle a second time, absorbed approximately the same amount of oil in this second cycle as they did in the first cycle. From the above, it can also be concluded that after the first cycle 100 percent of the absorbed oil may be recovered from the ethylene-methyl acrylate copolymer foams.

EXAMPLE 8

Since straw has in the past often been used to clean up oil spills or slicks at sea, it was desired to obtain some quantitative measure of its oil absorption capacity, which data was provided by the experiments of this example. It was also thought that these oil absorption figures for the straw could then be later compared with plastic foams.

Wheat straw in the amount of 50 g. was completely immersed in Kuwait crude oil for an hour at room temperature. Following the immersion for this time period, the straw was taken out of the crude oil and allowed to drain for a period of 1 hour after which time it was weighed. The oil-wet straw was found to weigh 151 g.

In another experiment, small bundles of straw of about 4 inches in length were allowed to float on Kuwait crude oil with care being taken to see that the ends of the individual straws were immersed in the oil. One bundle of wheat straw weighing 2.5 g. dry weighed 3.5 g. after floating on the crude oil for a period of 2 hours. A second bundle also weighing 2.5 g. when dry was first immersed in water after which it weighed 5.5 g. This water-wet straw bundle was then immersed in Kuwait crude oil for a period of 1 hour and then drained and reweighed. The final weight of this bundle was 7.0 g. The results obtained in these experiments are summarized below in Table IV on a percentage basis.

Table IV

| Conditions | Oil Absorbed, % of Dry Weight | Water Absorbed, % of Dry Weight |
| --- | --- | --- |
| Total immersion | 202 | — |
| Floating on oil | 40 | — |
| Wet straw immersed in oil | 60 | 120 |

During these experiments, it was observed that wheat straw consists of a hollow tube with a smooth outside surface. The inside walls of the tube are lined with a soft porous material not unlike a plastic foam, with little or no oil being absorbed on the outside walls. When the open end of a wheat straw touches an oil surface, the oil quickly soaks up the inside walls like a wick. Thus, to be effective, the straw must in some way be previously cut or broken to expose the open ends of the tubes. If water enters the tube first, this blocks out much of any oil absorption.

EXAMPLE 9

Since prior absorption of water by the oil recovery material may tend to reduce its oil absorption capacity, the water absorption was measured and recorded for straw and a number of plastic foams.

Samples of wheat straw, the ethylene copolymer foam of this invention, rubber foam and polyurethane foam were totally immersed in water at room temperature for nearly 6 hours. These samples were then removed from the water and allowed to drain for a period of 15 to 20 minutes after which they were reweighed. The weight of the samples were recorded and the amounts of water absorbed by each sample was determined. The results obtained in these experiments are set forth in Table V below.

Table V

| Sample | Dry Weight g. | Wet Weight g. | Absorbed Water, % of Dry Weight | Average of Water Absorbed, % |
|---|---|---|---|---|
| Wheat Straw | 10.2 | 34.0 | 234 | |
| | 13.2 | 47.2 | 257 | |
| | 12.4 | 46.7 | 276 | 256 |
| Ethylene-Methyl Acrylate Foam | 3.22 | 3.61 | 12.1 | |
| | 2.98 | 3.50 | 17.4 | 14.8 |
| Polyurethane Foam | 1.20 | 2.60 | 117 | |
| | 1.44 | 3.20 | 122 | 119 |
| Rubber Foam | 4.31 | 6.10 | 40.5 | |
| | 4.29 | 7.01 | 63.5 | 52 |

From the above data, it is seen that the ethylene copolymer foam of this invention has the lowest water absorption, approximately 14.8 percent, and the straw has the highest water absorption value, approximately 256 percent. Since the ethylene copolymer foam of this invention absorbs only about 15 percent or less water and absorbs approximately 1,100 percent or more crude oil, it shows the highest selectivity for oil of any of the other compared absorbents. Note the poor selectivity of wheat straw, which typically absorbs about 200 percent oil and 250 percent water, but not both at the same time. Indeed, the absorption of water by the ethylene copolymer foam of the invention in no way affects its oil absorption capacity or characteristics.

EXAMPLE 10

The selectivity of an absorbent material for oil in an oil and water mixture is probably the most basic and important property when considering oil pick up or removal from a water surface. This oil selectivity of a material may be calculated from the ratio of its oil absorption capacity to its water absorption capacity. Table VI set forth hereinbelow shows the absorption capacities of wheat straw and various plastic foams (which absorption capacities have been previously reported herein) and the calculated oil selectivity for each type of material.

Table VI

| Sample | Oil Absorbed, % of Dry Weight | Water Absorbed, % of Dry Weight | Selectivity Oil/Water, Wt. |
|---|---|---|---|
| Rubber Foam | 156 | 52 | 3.00 |
| Polyurethane Foam | 687 | 119 | 5.78 |
| Ethylene-Methyl Acrylate Foam | 1250 | 14.8 | 84.5 |
| Wheat Straw | 202 | 256 | 0.79 |
| Wet Wheat Straw | 60 | 120 | 0.50 |

The above recorded data show that the ethylene copolymer foam of this invention has a much higher selectivity for oil than the other absorbent materials with which it has been compared and the results of which are recorded above. It should also be noted from the above table that the wheat straw has a greater preference or selectivity for water than for oil.

With detailed reference to the drawing now, there is illustrated in FIG. 1 thereof an arrangement for carrying out the method or process of this invention. As can be seen therein, a body of water 10 having a surface portion or area 12, such as an ocean, bay, harbor, river, inland lake, or the like, exists adjacent a land area 14. Body of water 10 and land area 14 meet and adjoin one another at a bank, beach, or the like 16. The surface 12 of water body 10 has existing thereon an oil slick or spill 18 which it is desired to clean up or remove and generally recover by the method or process of this invention. One method of accomplishing the selective recovery of oil spill or slick 18 from surface 12 of water body 10 by the means of this invention is by employing the improved ethylene copolymer foam absorber of the invention in an arrangement as depicted in FIG. 1. In carrying out this particular method, a first ship, vessel or barge 20 is used and may be termed the spreading or casting ship. Ship 20 typically has 3 compartments or sections therein being respectively identified as storage section or compartment 22, foaming section or compartment 24 and spreading or casting section or compartment 26. In operation pellets or chunks, of conveniently transportable and storable size, of the blended mixture or material, such as obtained in Example 1, are stored within section 22 of spreader vessel 20 until the same are to be employed in the removal and recovery of oil. Then when spreader vessel 20 is in the vicinity of the oil spill or slick 18, the pellets or chunks in section 22 of vessel 20 are fed into foaming section 24 thereof. In foaming section 24 the pellets of the blended material are exposed to elevated temperatures in the range of about 150° to 180° C. for periods of up to about 30 minutes for expansion into a free-rising open-cell ethylene copolymer foam composition. The resultant foam is then directed from section 24 into the casting or spreading section 26 for spreading or casting an oil slick 18 as vessel 20 moves in the direction of arrow 27. The foam composition is typically spread or cast over, on and about oil slick 18 by means of an air blower 28 in the form of small chunks or pieces 30. It may be necessary to grind or chop the foam composition exiting section 24 or in its passage through section 26 before exiting through air blower 28 on to oil slick 18. The foam particles or pieces 30 are allowed to remain on or within oil slick 18 for time periods sufficient for them to absorb their oil capacity before they and the absorbed oil are collected, gathered and picked up by a second or recovery ship, vessel or barge 32. Vessel 32 is equipped with means such as scoop or rake 34 adjacent its bow 36 to generally pick up, collect and gather the foam chunks and chips and the oil absorbed therein as vessel 32 moves in the direction of arrow 37. Scoop or rake-like structure 34 delivers the foam particles and absorbed oil to a holding or storage section or compartment 38 and may employ belts or conveyors in so doing. From storage section 38 the foam particles and absorbed oil are delivered to recovery section or compartment 40 wherein the oil is recovered from the foam by expression and squeezing thereof. The recovered oil is then stored in the hold of vessel 32 and the particles of foam, after expression and recovery of the oil, may be immediately reused, stored for future use or disposed of as may be desired.

In working with these ethylene copolymer foam compositions and the employment thereof in the removal and recovery of oil from water surfaces, it was observed that the foam could be compressed over long time intervals at room temperatures or even somewhat above room temperatures without adverse effects on the foam. This is to say, that after compression the foam would recover substantially all of its original volume and would absorb as much crude oil as a comparable foam which had not been compressed. Thus, the foams of this invention could be compressed and remain compressed for substantial periods of time at or near room temperatures as a practical means to reduce the shipping and storage space required for these foams before the same are used in the recovery of oil.

In addition to the large absorption capacity, the ethylene copolymer foams of this invention offer a number of other advantages in the removal and recovery of spilled oil. For instance, the copolymer foams described herein occupy a minimum of storage and transportation space since they may be kept in the unfoamed state and foamed only when needed. If suitable equipment is provided, the ethylene copolymer material may be foamed at the site of the oil spill, whether it be on board a ship adjacent the oil spill or on the land adjacent the oil floating on the water. The ethylene copolymer foams of this invention may be applied to the oil spill in a variety of ways. The foam may be cut into small chips and spread on the water with an air blower or it may be dropped from an aircraft or the same may be manually spread or pitched on the oil and water by a fork or other means. Also, blocks of the foam may be held in a net such as a fishing net which is closed to hold the foam blocks in a long sausagelike shape. The floating net could then be pulled around and over the oil to absorb it. Once the oil is absorbed by the foam, the same may be recovered continuously by running the net between rollers mounted on a ship or barge adjacent the oil spill. This ship or barge could also be equipped with net hoisting machinery and facilities for holding the recovered oil.

An additional useful form of the ethylene copolymer foams described in this invention would be to make a sheet or strip of the foam in which a net or other like reinforcing structure is embedded. This type of construction is easily accomplished because the copolymer blend first melts into a viscous liquid before foaming and the net or other reinforcing structure could be pressed into the molten blend at this stage. The herein described ethylene copolymers form strong adhesive bonds with nearly all materials so the copolymer blend would be strongly attached to the net without the need of additional adhesives or processing, and upon foaming would form a foamed structure about the net or other reinforcing structure with the same embedded therein.

While the ethylene copolymer foams used in the examples have been that of an ethylene-methyl arcylate copolymer having a rather specific methyl arcylate content, equally good foams have been produced from ethylene copolymers containing from approximately 16 up to approximately 46 weight percent methyl arcylate. The amounts of the other formulation ingredients used in Example 1 were selected to give a particular set of physyal properties. Each of the formulation ingredients may be varied in amount over a rather wide range and the foam still retains superior oil absorbing properties. Each of the formulation ingredients may be replaced by a large number of other materials which perform the same function. Thus, the blowing agent pair, azodicarbonamide-CBP-2, may be replaced by sodium bicarbonate, and the crosslinking agent, dicumyl peroxide, may be replaced by a number of other organic peroxides. The viscosity modifier, lauryl acrylate, may be replaced by materials such as 2-ethyl hexyl acrylate, bacon grease or linseed oil.

In cleaning up spilled oil by the usual and presently used means, such as by spreading straw on it, the oil-covered straw is taken to a suitable place and burned. Thus, the oil and straw are both wasted, air pollution is generated, and labor and money are needed to transport the wet straw and burn it. The ethylene copolymer foams and the processes employed with them as described herein avoid these difficulties and disadvantages in that the oil is recovered in a useful form, no air pollution is produced, and there is an economy of labor.

While only certain preferred embodiments of this invention have been described and shown by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. A method for the selective removal of oil from water surfaces consisting essentially of the steps of spreading a foam of an ethylene-alkyl acrylate copolymer having a melt index of at least 800 on the oil on the water surface, allowing said foam to selectively absorb oil from the water surface, and thereafter gathering and collecting said foam with the absorbed oil from the water surface.

2. The method as set forth in claim 1 wherein said ethylene-alkyl acrylate copolymer is a copolymer of ethylene and methyl acrylate.

3. The method as set forth in claim 2 wherein said copolymer has a melt index in the range of from about 1,000 up to about 2,500 and said methyl acrylate is present in said copolymer in an amount of from about 15 up to about 45 weight percent.

4. A process for the removal and recovery of oil from water surfaces consisting essentially of the steps of contacting the oil on the water surface with a foam produced from an ethylene-alkyl acrylate copolymer having a melt index of at least 800, allowing said foam to absorb the oil from the water surface, gathering and collecting said foam with the absorbed oil, and thereafter recovering the absorbed oil from said foam by expression and squeezing of said foam whereby substantially all of said absorbed oil is recovered.

5. The process as set forth in claim 4 wherein said ethylene-alkyl acrylate copolymer is a copolymer of ethylene and methyl acrylate.

6. The process as set forth in claim 5 wherein said copolymer has a melt index in the range of from about 1,000 up to about 2,500 and said methyl acrylate is present in said copolymer in an amount of from about 15 up to about 45 weight percent.

* * * * *